(12) United States Patent
Burgos et al.

(10) Patent No.: US 9,136,773 B2
(45) Date of Patent: Sep. 15, 2015

(54) METHOD OF EVALUATING AND ENSURING STABILITY OF AC/DC POWER SYSTEMS

(75) Inventors: Rolando Burgos, Blacksburg, VA (US); Dushan Boroyevich, Blacksburg, VA (US); Fred Wang, Knoxville, TN (US); Kamiar Karimi, Kirkland, WA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 337 days.

(21) Appl. No.: 13/608,213

(22) Filed: Sep. 10, 2012

(65) Prior Publication Data
US 2013/0076332 A1    Mar. 28, 2013

Related U.S. Application Data

(60) Provisional application No. 61/532,588, filed on Sep. 9, 2011, provisional application No. 61/535,398, filed on Sep. 16, 2011.

(51) Int. Cl.
*H02M 5/458* (2006.01)
*H02M 7/217* (2006.01)
*H02M 1/00* (2007.01)

(52) U.S. Cl.
CPC ............ *H02M 5/4585* (2013.01); *H02M 7/217* (2013.01); *H02M 2001/0012* (2013.01)

(58) Field of Classification Search
CPC ... H02M 5/297; H02M 5/458; H02M 5/4585; H02M 7/217; H02M 7/2173; H02M 2001/0012

USPC ................ 363/84, 87, 89, 125, 127, 157, 159
See application file for complete search history.

(56) References Cited

U.S. PATENT DOCUMENTS

| | | | |
|---|---|---|---|
| 6,051,941 A * | 4/2000 | Sudhoff et al. | 318/140 |
| 2010/0153900 A1* | 6/2010 | Mohan et al. | 716/18 |
| 2013/0054035 A1* | 2/2013 | Berggren et al. | 700/286 |
| 2013/0057191 A1* | 3/2013 | Yoshiura et al. | 318/600 |
| 2013/0214708 A1* | 8/2013 | Saeki et al. | 318/376 |
| 2014/0032148 A1* | 1/2014 | Verhulst et al. | 702/65 |
| 2014/0122050 A1* | 5/2014 | Fu et al. | 703/18 |

OTHER PUBLICATIONS

Burgos, R. et al., "On the Ac stability of high power factor three-phase rectifiers," Energy Conversion Congress and Exposition (ECCE), 2010 IEEE, pp. 2047,2054, Sep. 12-16, 2010 doi: 10.1109/ECCE.2010.5618091 Obtained from http://ieeexplore.ieee.org/stamp/stamp.jsp?tp=&arnumber=5618091&isnumber=5617696 on Sep. 29, 2014.*

(Continued)

*Primary Examiner* — Fred E Finch, III
(74) *Attorney, Agent, or Firm* — Whitham Curtis Christofferson & Cook, PC

(57) ABSTRACT

Approximating loci of eigenvalues or characteristic gains of a return ratio matrix of a model of a multi-phase power converter circuit by the loci of the d-d and q-q elements of said synchronous frame of reference applied to said model, allows determination and assessment of stability of the circuit or forbidden operational parameters of the combination of an AC power source and a power converter at an interface thereof by application of a standard Nyquist stability criterion.

20 Claims, 16 Drawing Sheets

(56) References Cited

OTHER PUBLICATIONS

Burgos et al.; "Ac Stability of High Power Factor Multi-Pulse Rectifiers"; Energy Conversion Congress and Exposition (ECCE), IEEE, Sep. 17, 2011, pp. 3758-3765.

Francis et al.; "An Algorithm and Implementation System for Measuring Impedance in the D-Q Domain"; Energy Conversion Congress and Exposition (ECCE), IEEE, Sep. 17, 2011, pp. 3221-3228.

* cited by examiner $\zeta \cdot (L_{dd}(s)-L_{qq}(s))^2 > 4 \cdot L_{qd}(s) \cdot L_{dq}(s)$,
where $\zeta$ is a large enough constant, the root term in (19) may
be approximated by (20)

$$\sqrt{(L_{dd}(s)-L_{qq}(s))^2 + 4 \cdot L_{qd}(s)L_{dq}(s)} \approx L_{dd}(s)-L_{qq}(s). \quad (21)$$

The eigenvalues of $L_{dq}(s)$ are then approximated as $$l_{1,2}(s) = \frac{L_{dd}(s)+L_{qq}(s)}{2} \pm \frac{L_{dd}(s)+L_{qq}(s)}{2} \quad (22)$$

THEREFORE $$l_1(s)=L_{dd}(s) \quad l_2(s)=L_{qq}(s) \quad (23)$$

WHICH DEMONSTRATES
(REWRITTEN)

IF $$l_1(s)=Z_{sdd}(s) \cdot Y_{Ldd}(s) \quad l_2(s)=Z_{sqq}(s) \cdot Y_{Lqq}(s) \quad (24)$$

FIGURE
OF MERIT $$AC_{index}(s) = 20 \log \left( \frac{(L_{dd}(s)-L_{qq}(s))^2}{4 \cdot L_{qd}(s) \cdot L_{dq}(s)} \right) \quad (25)$$

VERIFIED BY:

GERSHGORIN
BANDS $$|s - a_{ii}| \leq \sum_{\substack{j=1 \\ j \neq i}}^{m} |a_{ij}| \quad |s - a_{ii}| \leq \sum_{\substack{j=1 \\ j \neq i}}^{m} |a_{ji}| \quad (26)$$

$$l_1(s)=L_{dd}(s) = Z_{sdd}(s) = Z_{sdd}(s) \cdot Y_{Ldd}(s) \quad (27)$$

*Figure 1C*

METHOD OF EVALUATING AND ENSURING STABILITY OF AC/DC POWER SYSTEMS

CROSS-REFERENCE TO RELATED APPLICATIONS

This application claims benefit of priority of U.S. Provisional Patent Applications 61/532,588 filed Sep. 9, 2011 and 61/535,398, filed Sep. 16, 2011, both of which are hereby incorporated by reference in their entireties.

FIELD OF THE INVENTION

The present invention generally relates to power converters and loads receiving power from a three phase alternating current (AC) sources and, more particularly, to the design and evaluation of such power converters in regard to stability.

BACKGROUND OF THE INVENTION

Traditionally, electrical power has been produced by large, geographically separated facilities and transmitted as high-voltage alternating current to other locations. These large Power generation facilities are connected through a network, sometimes referred to as a power grid such that power produced by locations having excess power generation capacity can be diverted to areas where loads may be particularly large at any given time. In the proximity of loads, the voltage is generally reduced in stages and further distributed until the location of various loads is reached. The high voltage used for transmission over long distances allows currents and resistive losses to be reduced while using cables of reduced conductor material content. Use of alternating current allows the reduction of voltage by the use of transformers. Alternating current can also be directly used by many common and familiar loads such as household appliances, pumps using electric motors and the like.

However, many familiar loads are principally based on electronic circuits which are rapidly increasing in number and power requirements and the proportion of the load of many other devices that is presented by electronics (e.g. processor controlled appliances) is also increasing rapidly. Many new devices such as electrically powered vehicles are also being introduced. Additionally, environmental concerns have encouraged the development of local power generation and/or storage systems in many locations to serve local "islands" or groups of customers where power distribution can be provided as either AC or direct current (DC). Power storage must generally be provided with DC power. Therefore, the need for conversion to tailor the conventionally supplied power from AC networks into desired but different AC and DC power is proliferating rapidly at the present time.

Power converters are, by their nature, non-linear and their dynamic behaviors are coupled with those of the load from which they receive power or the source providing power through them. As a consequence, many power electronics systems will require control in order to provide a regulated output. However, provision of such regulation causes additional phenomena that have not been previously observed or considered to be of importance, including but not limited to issues of stability.

Specifically, a power converter under regulated output control exhibits negative incremental impedance characteristics at its input. That is, in the case of converters regulating voltage (to a different form of that of the source), the current consumed by them is inversely proportional to voltage variations of the source in order to maintain a constant power flow to the load. This is the inverse behavior of resistive loads, whose current consumption is directly proportional to voltage variations of the source. Consequently, the small-signal response at a given operating point, corresponding to the linearization of the converter at such point, presents negative phase. As is well recognized in the art, negative impedance can result in instabilities and possibly oscillatory behavior of the circuit with detrimental effects to the system where they operate.

While the extensive power grid can tolerate many of these behaviors since the effect of converter behavior is small compared to the size of the system, such behaviors cannot be tolerated by smaller systems which have their own, relatively small capacity power source and are not connected to the effectively infinite power grid. Examples of such smaller systems are aircraft, water-borne vessels, hybrid electric vehicles and small power plants (e.g. wind turbines or solar collector farms) serving individuals or small "islands" of customers. Other examples of circumstances where unstable behavior may occur are instances where electrical loads are connected through equipment such as frequency changers (AC/AC converters), AC/DC converters and other types of hardware. Vehicular systems also operate at higher line frequencies than the line frequencies traditionally used for power distribution and present other phenomena and challenges in regard to control.

Systems which can potentially exhibit unstable behaviors are becoming prevalent due to proliferation of systems such as are discussed above and, further, by shifting functions previously performed mechanically or hydraulically to electrically powered functions. Accordingly, it is imperative that potential instabilities be made predictable and avoided in the design of such systems. Therefore, stability of electrical systems has been a subject of substantial interest and study in recent years; yielding some solutions for DC systems such as DC/DC converters. However, there are issues not seen in DC systems which are present in AC systems and multi-phase AC/DC systems, in particular, which are referred to as multi-variable systems. While some progress has been made in regard to determining stability or forbidden operating conditions of multi-phase AC/DC systems, the analysis has been extremely complex and burdensome and has, in general, led to excessively conservative designs and operating parameters.

SUMMARY OF THE INVENTION

It is therefore an object of the present invention to provide a much simplified and broadly applicable methodology for studying and determining multi-phase AC/DC system stability that is applicable to both system evaluation and system design through development of a stability criterion that can be applied to systems much more simply and directly than has been possible in the past.

In order to accomplish these and other objects of the invention, a method of designing a combination of an AC power source and active front end (AFE) power converter or assessing stability of a combination of an AC power source and an active front end power converter comprising steps of applying a synchronized frame of reference to a model of the AC source and power converter, approximating loci of eigenvalues or characteristic gains of a return ratio matrix of said model by the loci of the d-d and q-q impedance elements of said synchronous frame of reference applied to said model, and determining stability of the combination of the AC power source and the power converter at an interface thereof by application of a standard Nyquist stability criterion.

BRIEF DESCRIPTION OF THE DRAWINGS

The foregoing and other objects, aspects and advantages will be better understood from the following detailed description of a preferred embodiment of the invention with reference to the drawings, in which:

FIGS. 1A, 1B and 1C form a high-level flow chart of the rigorous analysis by which a simplified stability criterion in accordance with the invention is developed and applied, FIG. 2, schematically illustrates a generic multi-variable closed loop configuration of a feedback system, FIG. 3 schematically illustrates a multi-variable closed loop configuration with a rotating frame of reference applied.

DETAILED DESCRIPTION OF A PREFERRED EMBODIMENT OF THE INVENTION

Figure 1A:
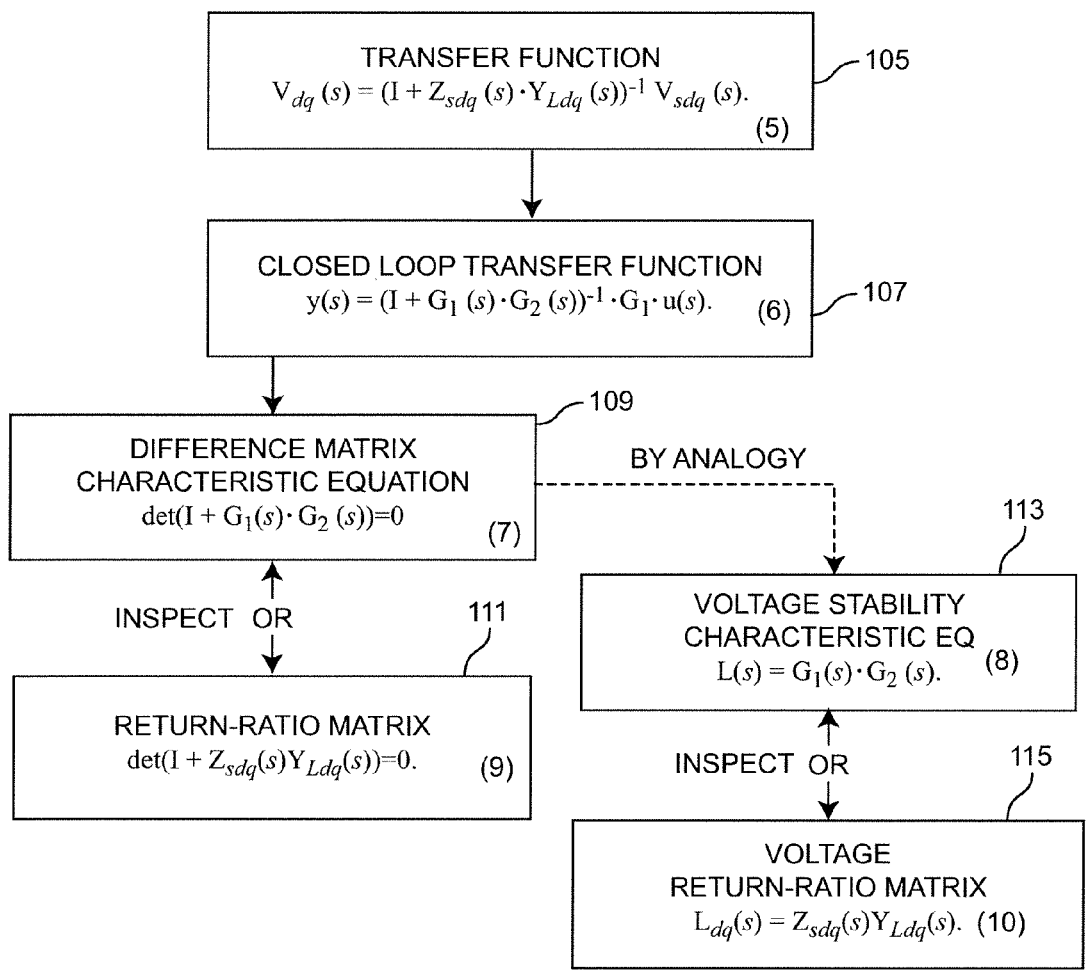
Figure 1B:
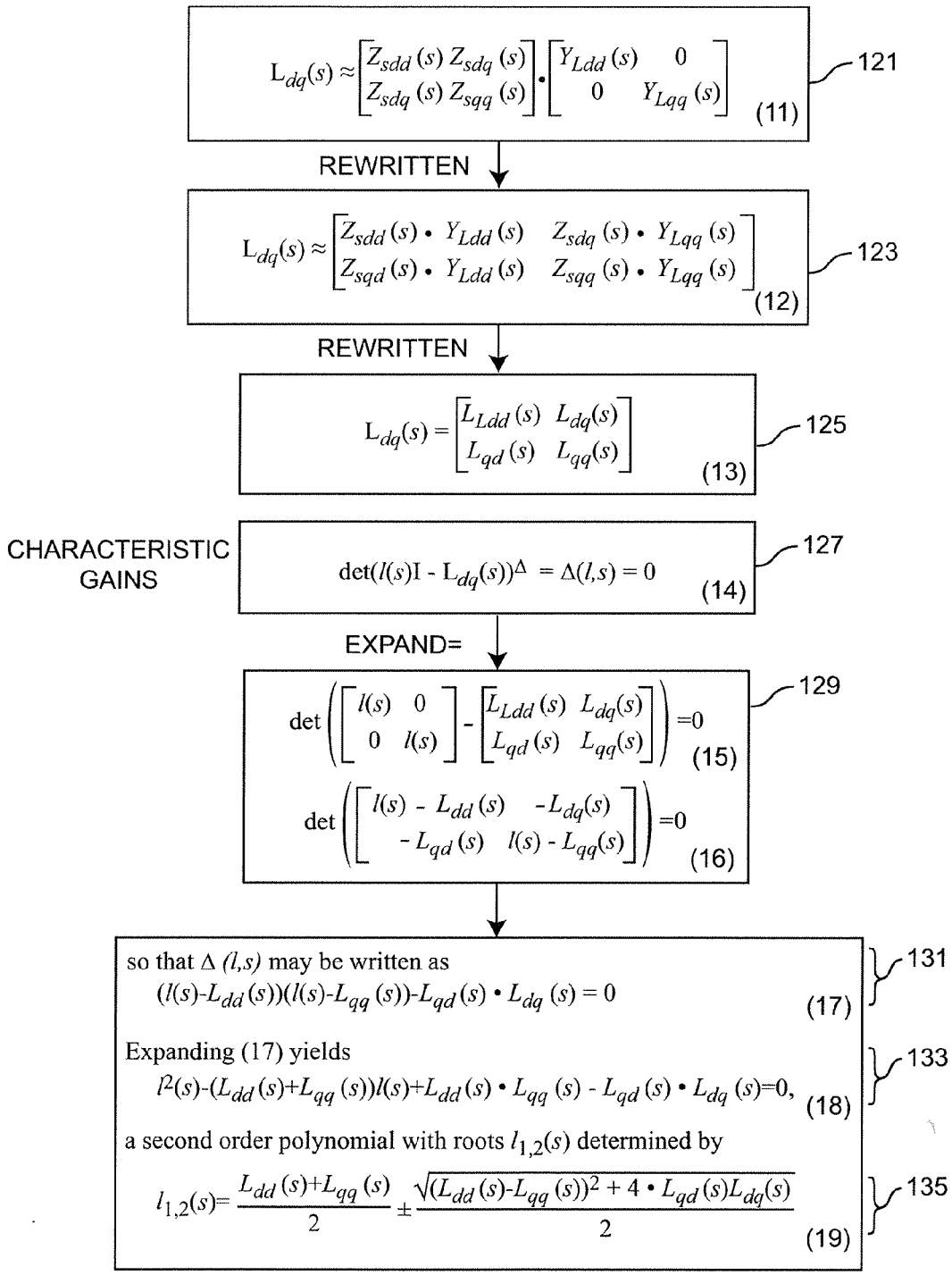

Referring now to the drawings, and more particularly to FIGS. 1A, 1B and 1C, there is shown a high-level flow chart illustrating the rigorous analysis by which the simplified stability criterion in accordance with the invention is developed and applied and which establishes the efficacy of that simplified stability criterion to predict stability and/or identify conditions under which unstable electrical behaviors may arise. While the methodology illustrated in these Figures draws upon known efforts toward stability analysis as alluded to above, no portion of any of these Figures is admitted to be prior art in regard to the present invention. Such known efforts are discussed in detail in published articles entitled "On the AC Stability of High Power Factor Three-Phase Rectifiers" by R. Burgos et al., Energy Conversion Congress and Exposition (ECCE), IEEE, pp. 2047-2054, Sep. 12, 2010; "AC Stability of High Power Factor Multi-pulse Rectifiers", R. Burgos et al., Energy Conversion Congress and Exposition (ECCE), IEEE, pp. 3758-3765, Sep. 17, 2011; and "An algorithm and Implementation System for Measuring Impedance in the D-Q Domain", G. Francis et al., R. Burgos et al., Energy Conversion Congress and Exposition (ECCE), IEEE, pp. 3221-3228, Sep. 17, 2011, all of which are incorporated herein by reference in their entireties, including the bibliographic information appended to these respective articles.

As also alluded to above, oscillation between DC/DC converters and input filters due to constant power dynamics was first observed about forty years ago and the phenomenon was later studied and clarified by studying the loop-gain or return-ratio, $Z_{source}(s)/Z_{load}(s)$, of the source and load impedances seen at the interface between the converter and filter by means of the single-input, single-output (SISO) Nyquist stability theorem. An equivalent input-output impedance approach has been applied to AC power systems by applying a synchronous d-q frame (which will be described in greater detail below) return ratio matrix $Z_{sdq}(s) \cdot Y_{Ldq}(s)$, to study the stability of the three-phase AC power interface using conventional multi-variable linear control theory to limit the source and load impedance magnitudes. This approach has been used as the principal stability criterion even though it is extremely complex and burdensome to apply and leads to excessively conservative designs and operating parameters.

This latter stability criterion was later improved by using the multi-variable Nyquist diagram to evaluate the stability of the d-q frame return ratio matrix. The conservative nature of the AC stability criterion was reduced by the development of a reduced order model for active front end (AFE) converters which showed the direct association between the power transfer channel in the d-q frame and the constant power load dynamics of AFE converters as well as showing that the conventional Nyquist criterion could be used to study the stability of the reduced order model.

A further improvement has been proposed to employ the generalized Nyquist stability criterion (GNC) to assess the stability in the d-q frame. This further improvement consolidated the frequency response control methods developed for multi-variable linear systems and has proven to be of value for AC distributed power systems although it has not been widely used for control of multi-variable systems, possibly due to the intricacy of the GNC as well as its complex physical interpretation. The invention provides for reduction of this complex and burdensome study of the synchronous d-q frame using the GNC to a study of the SISO case using the standard Nyquist criterion and demonstrates the inherent relationship between the frequency-dependent eigenvalues $\{l_1(s), l_2(s)\}$ of the return ratio matrix $L_{dq}(s) = Z_{sdq}(s) \cdot Y_{ldq}(s)$, and the active and reactive power transfer across the d-q frame interface, and that only $l_1(s)$ can be the source of instability at the AC interface.

Figure 2:
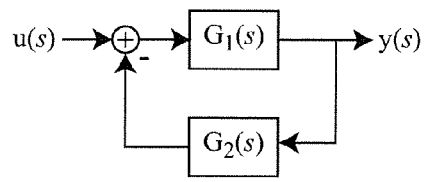

For completeness, the generalized Nyquist stability criterion is restated here. Consider the generalized feedback system as illustrated in FIG. 2 where $G_1(s)$ and $G_2(s)$ are a pair of linear multi-variable systems whose behavior is governed by the following set of state-space equations:

$$x_i = A_i x_i + B_i u_i$$

$$y_i = C_i x_i + D_i u_i \qquad (1)$$

and let their respective transfer functions be:

$$G_i(s) = C_i(sI - A_i)^{-1}B_i + D_i \qquad (2)$$

for i=1, 2. Further, suppose that $G_1$ has m inputs and $G_2$ has m outputs and let L(s) be the return ratio matrix when the feedback loop is open and let $\{l_1(s), l_2(s) \ldots l_m(s)\}$ be the set of characteristic functions of L(s) with characteristic loci $N_1$, $N_2 \ldots N_m$ in the complex plane as traverses the standard Nyquist stability contour in a clockwise direction. Then the generalized Nyquist stability criterion may be stated as:

Let the multi-variable feedback system as shown in FIG. 2 have no open-loop unobservable or uncontrollable modes whose characteristic frequencies will be in the right half of the complex plane. Then this configuration will be stable if and only if the net sum of anticlockwise encirclements of the critical point (−1, j0) by the set of characteristic loci of L(s) is equal to the total number of right-half complex plane poles of $G_1(s)$ and $G_2(s)$.

Since uncontrollable and unobservable modes are not influenced by feedback, their possible presence adds a further necessary condition for stability. That is, that all corresponding characteristic frequencies must be in the left-half of the complex plane. In such a case, the encirclement criterion remains necessary but is no longer sufficient for closed loop stability. Further, since the criterion is built over the return-ratio matrix, the possibility of pole-zero cancellations between the cascaded systems that make up the transmittance should be considered.

Referring again to FIGS. 1A-1C, as alluded to above, the nature of constant power loads results in a negative incremental impedance at the input terminals which has been studied using the Nyquist criterion at DC interfaces by applying it to the return ratio $Z_o/Z_{in}$ of the following transfer function:

$$V_{dq}(s)/V_{dc\ source}(s) = 1/(1 + Z_o(s)/Z_{in}(s)). \qquad (3)$$

Three-phase systems, however, are multi-variable in nature and that type of analysis cannot be directly applied.

Figure 3:
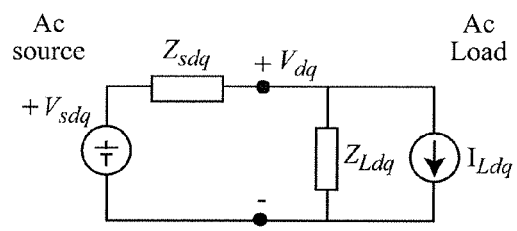

In order to apply a similar type of analysis, a frame of reference that is synchronously rotating with the AC input can be applied to allow the AC source to be considered as a DC source; as shown in FIG. 3. This frame of reference is referred to as a d-q frame and converts all AC variables into constant quantities and thus provides a quiescent point for linearization. The terminal voltage, $V_{dq}(s)$, is determined by equation (4) as $$V_{dq}(s) = Z_{Ldq}(s) \cdot Z_{sdq}(s) + Z_{Ldq}(s))^{-1} \cdot V_{sdq}(S). \qquad (4)$$

This representation is the counterpart to the closed loop transfer function of the multi-variable system configuration shown in FIG. 2 which is defined as shown at 107 of FIG. 1A. The stability of this closed-loop system may be determined by studying its characteristic equation which depends on the determinant of its return difference matrix as shown at 109 of FIG. 1A or, directly by studying the return-ratio matrix defined as shown at 111 of FIG. 1A. By analogy, the voltage stability of equation (5) may be determined by studying the characteristic equation shown at 113 of FIG. 1A or directly by studying its return-ratio matrix as shown at 115 of FIG. 1A.

The disadvantage of using the generalized Nyquist stability criterion or the multi-variable Nyquist stability criterion, which are the prior approaches to the AC stability problem, is that it is very difficult to relate the elements of the source impedance and load admittance to the characteristic polynomial that determines the frequency-dependent eigenvalues of the return-ratio matrix, and to the trajectory described by them as the complex variable "s" traverses the standard Nyquist contour. A closer relationship between the characteristic gains or eigenvalues of the return-ratio matrix $L_{dq}(s)$ and the elements of the source and load impedance matrices measured at the interface of interest allows several stability criteria which are less conservative in their prediction of stability conditions.

The GNC has become the standard approach to study the stability of power systems and numerous d-q measurement techniques have been developed to implement such a method beyond system level simulation. However, such a method still retains a limitation on its applicability and practicality since the relationship between the characteristic gains or eigenvalues of the return-ratio matrix $L_{dq}(s)$ and the multiple impedances of the d-q frame channels remains unclear, as opposed to the straightforward stability study of DC power systems. Thus, the stability criteria developed from such studies provide only bounds for the characteristic gains or eigenvalues of the system and not for the impedances at the AC interface as would be desired since concise design specifications and guidelines are needed for enabling the power system designer to synthesize power systems with multiple converters and interfaces.

The invention, as will be described below, presents an alternative methodology to study the stability of AC power systems making full utilization of the GNC but taking advantage of the multi-thread Nyquist diagram that represents the characteristic loci of the impedance elements of the d-q frame, as opposed to the single diagram of the of the multi-variable Nyquist diagram, and establishes the relationship between the loci and the active and reactive power transfer in the AC system. Based on the similarity of loci of the eigenvalues and the impedance elements in the d-q frame, the methodology of the invention then shows the unequivocal link that exists between the source and load characteristic gains or eigenvalues of the return-ratio matrix, $L_{dq}(s)$ and the d-q frame source and load impedances seen at the power system interface. Further, the invention proves the direct connection between the source and load impedances seen on the d-d channel and the active power transfer on the d-q frame, showing that the multi-variable stability at the AC interface effectively reduces to the single input, single output (SISO) case. The conventional standard Nyquist stability criterion may then be employed to assess the stability of the AC power system. Thus the stability criterion in accordance with the invention enables the formulation of stability margins and the identification of forbidden operational parameters and conditions based on the source and load d-q frame impedances and thus provides for development of clear design specification for power electronics and system engineers.

To study the AC stability of AFE converters, several types of AC/DC converters were considered. The corresponding average models of these converters were developed together with other system components, such as generators, cables, inverters and electrical machines. These were used to calculate the input and output impedances at interfaces of interest by means of numerical linearization, and ultimately to assess system stability in terms of the GNC. An alternative approach is to conduct a frequency sweep using full-order switching power converter models, where the frequency response at each frequency point is obtained characterizing the source and load impedances in the process. This latter method is equivalent to a measurement process conducted when measuring the impedances of a physical AC power system.

After developing the average model for several active pulse width modulated (PWM) rectifiers, it was found that the stability of these converters regarding their constant power load behavior towards the AC power system was equivalent. For this reason, the following discussion will focus solely on two-level boost rectifiers for simplicity. The results are nonetheless independent of the converter topology in question, and can be readily applied to any other AFE converter.

Figure 4:
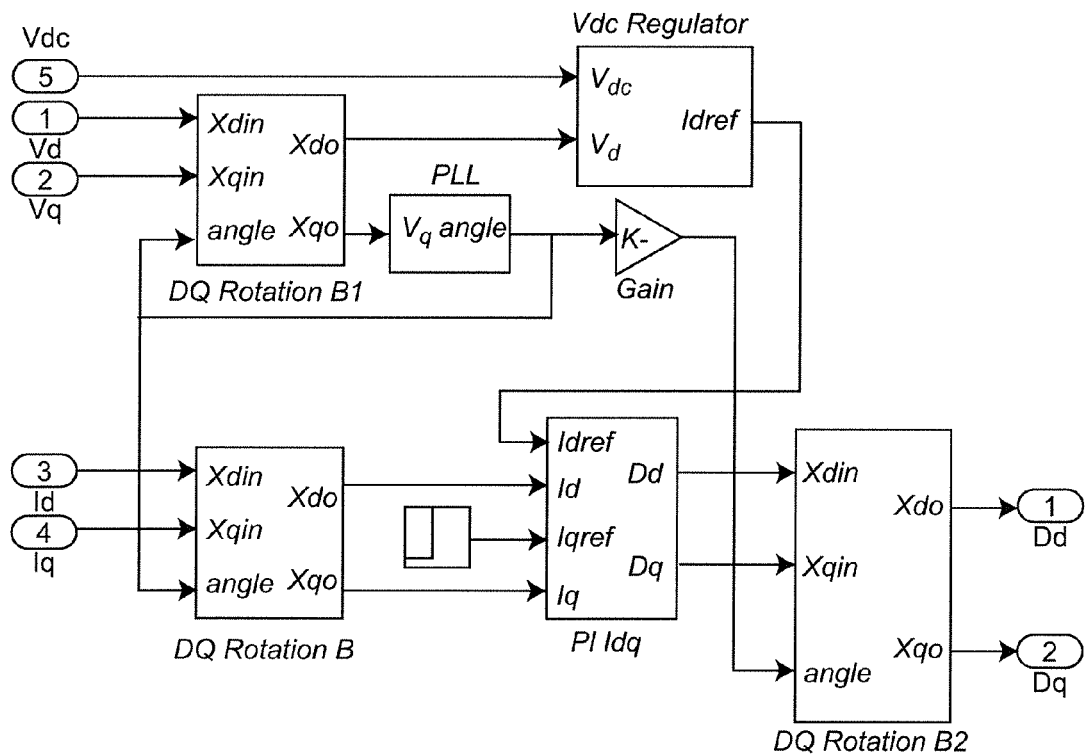
FIG. 4 is a block diagram of a d-q frame vector control for an active front end converter.

FIG. 4 is a block diagram of a d-q frame vector control for an active front end converter and shows that the control of the active front end (AFE) model is compatible with any d-q frame alignment of the input AC voltages. This compatibility is assured by the phase locked loop (PLL) that aligns the controller of the AFE converter with any given input voltage. This alignment of the reference frame is essential to run simulations of the converter with the synchronous generator, or to interface any other type of subsystems. With this control scheme, unity power factor (e.g. voltage and current are in phase) is achieved by the controller and the internal phase-locked loop (PLL) that aligns the converter with the existing d-q frame. This is a key difference compared to previous modelling methods, as it ensures the d-q frame compatibility while capturing all control dynamics, including the PLL with its low frequency dynamics affecting the converter current loop. The use of a simple rotation instead of such a control scheme in an effort to ensure the frame compatibility could yield erroneous results by neglecting the dynamic behavior and response of the PLL.

The stability at the AC interfaces feeding active front-end converters may be studied by means of the GNC by applying it to the return-ratio matrix $L_{dq}(s)$. This requires plotting the characteristic loci in the complex plane as the complex variable s traverses the standard Nyquist contour. However, as alluded to above, it is difficult to establish a clear link between the trajectory of these loci and the impedances of the AC system; thus the apparent complexity of this approach and perhaps the lack of success in applying it for the design and analysis of AC power systems. As will be shown hereinafter, the use of the generalized Nyquist stability criterion (GNC) may be simplified if further analysis is conducted on the frequency response of AFE converters.

Figure 5A:
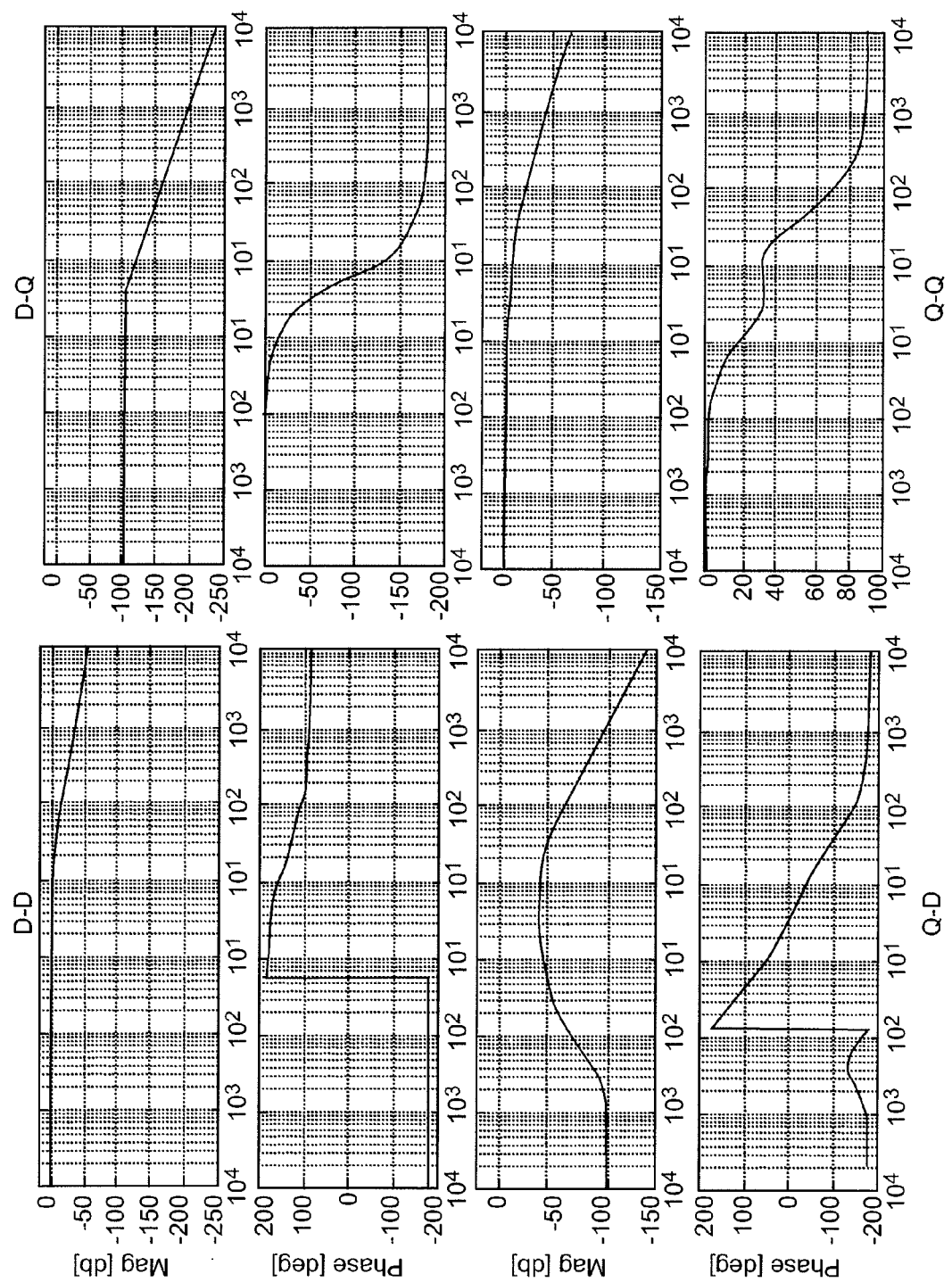
FIGS. 5A and 5B are a Bode plot and a Nyquist diagram of active front end converter admittance, respectively.

FIG. 5A shows the Bode plot of the input admittance $Y_{Ldq}(s)$ of an AFE converter calculated under d-axis alignment or active power transfer alignment. As seen, the d-d channel is the only channel that presents negative phase up to the roll-off frequency of the dc-bus voltage loop, indicating that all constant power load dynamics are reflected on this channel. The q-q channel shows an almost identical magnitude plot but behaves like a resistor instead, having 0° phase up to the roll-off frequency of the current vector controller. If the pulse width modulation (PWM) dead-time were not compensated, this admittance would have lower magnitude and hence a lower impact. It should also be noted that in case a reactive power controller were used as an outer loop to the q-axis current, a negative phase would be observed on this channel as well. For this reason, to attain unity power factor it is recommended simply to set the current reference on this axis to zero. Both the d-q and q-d channels present very attenuated magnitudes of at least −40 dB, with phases spanning from −180° to 0° and +180°. This low magnitude is a direct result of the current vector controller discussed above with regard to FIG. 4 that is independently controlling both channels and distributing the converter dynamics between the d-d and q-q channels. The very low magnitudes exhibited in the d-q and q-d channels should also make them negligible from a dynamic response and stability perspective.

Figure 5B:
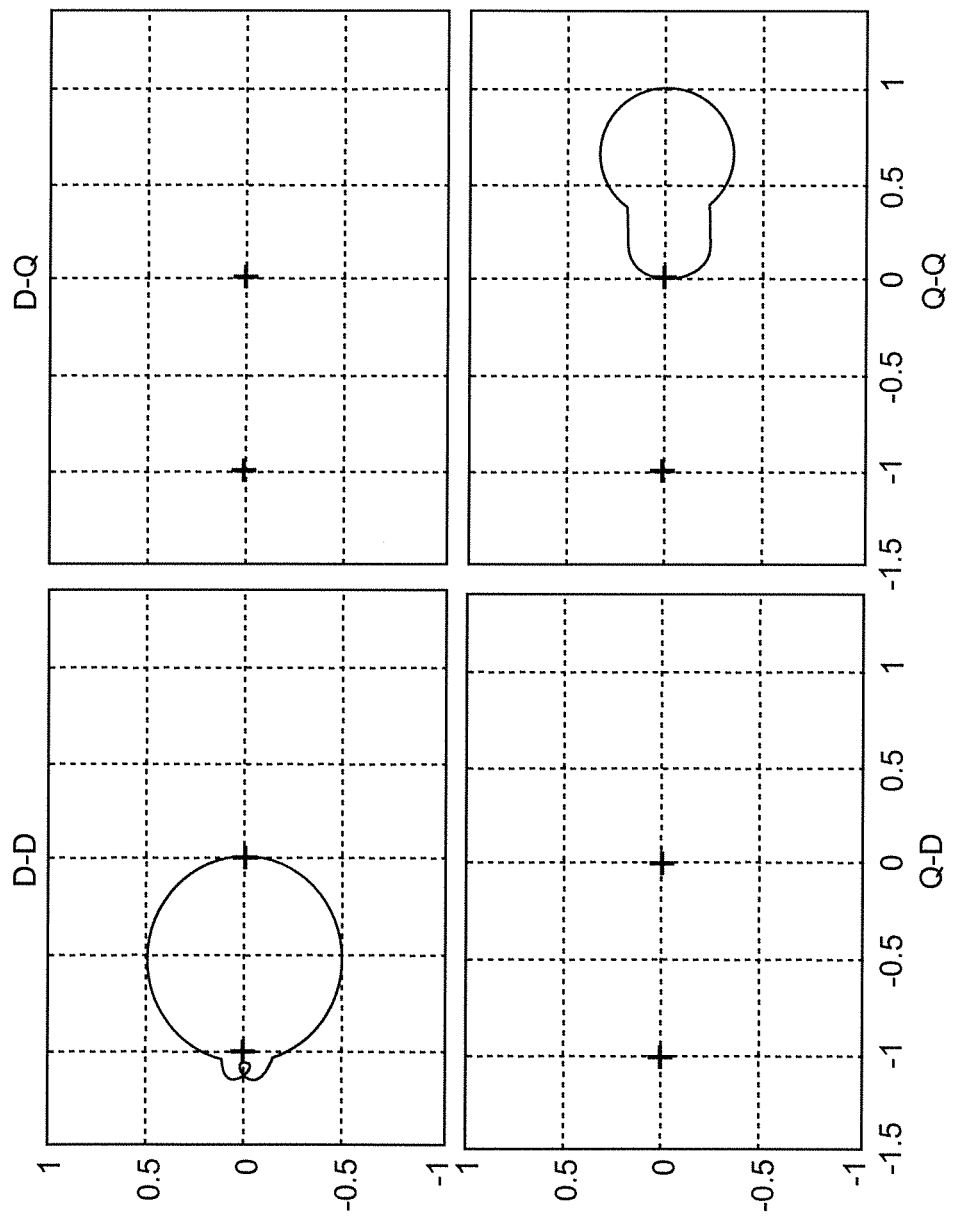

FIG. 5B shows the Nyquist diagram of the input admittance matrix $Y_{Ldq}(s)$, where the dominance of the d-d and q-q channels becomes evident. This plot shows how the cross-coupled dynamics between the d-q axes are completely negligible. It is also clearly observed from this diagram that the effect of the 0° phase observed on the q-q channel in FIG. 5A is that the Nyquist diagram of this channel resides completely on the right-half of the complex plane. The same analysis shows that the 180° phase observed on the d-d channel in FIG. 5A indicates that the Nyquist diagram of this channel resides completely on the left-half of the complex plane. Intuitively, this shows that the d-d channel Nyquist diagram, which apparently embodies the constant power load dynamic of the AFE converter, is the one that could cause instabilities on the system, as its Nyquist diagram grows towards the critical point (−1,j0). However, this is just the load admittance matrix of the return-ratio matrix, so no stability conclusions may be derived at this stage.

Figure 6:
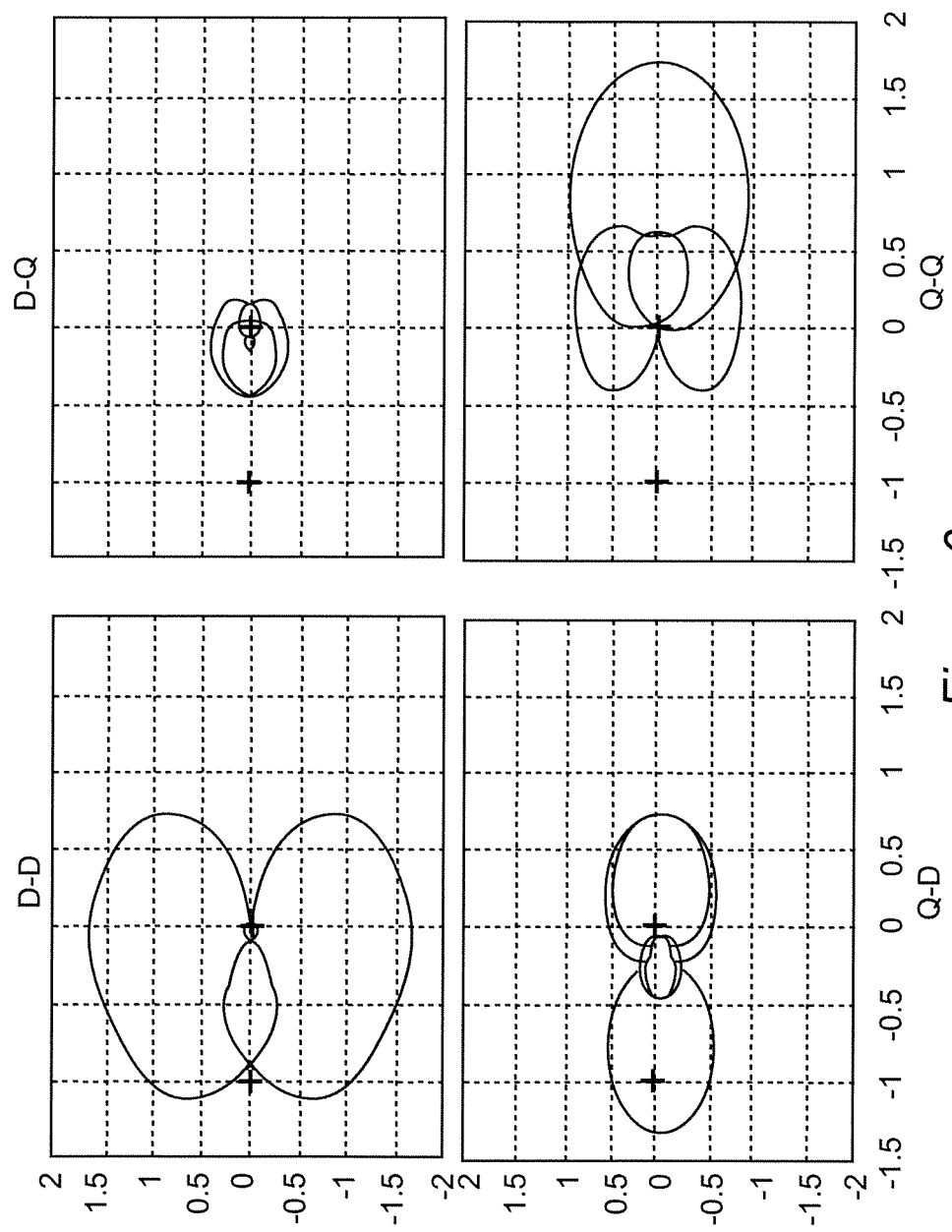
FIG. 6 is an array of Nyquist contours of the return-ratio at the AC interface of an active front end (AFE) rectifier.

However, with this new information, the return-ratio matrix $L_{dq}(s)$ may be written in expanded form as shown in equation (11) at 121 of FIG. 1B. Taking the product in equation (11) then yields the return-ratio matrix (12) for the AFE converter case as shown at 123 of FIG. 1B. Redefining $L_{dq}(s)$, element by element, equation (12) can be rewritten as shown at 125 of FIG. 1B. The Nyquist diagram of this matrix shown in equation (13) is shown in FIG. 6 which corresponds to the admittance shown in FIGS. 5A and 5B. As observed, all four elements of $L_{dq}(s)$ have a similar order of magnitude, with the d-d channel Nyquist diagram $L_{dd}(s)$ being predominant. It should be noted that the trend seen on the AFE input admittance for the d-d diagram to be primarily on the left-half plane, and for the q-q channel to be on the right-half plane, is maintained on the return-ratio matrix as well. The implications on stability in this case are direct and will therefore be analyzed closely below.

The generalized Nyquist stability criterion calls for study of the eigenvalues or characteristic gains $\{l_1(s), l_2(s), \ldots, l_m(s)\}$ of the return-ratio matrix $L_{dq}(s)$. In the case at hand it follows that these are given by $\{l_1(s), l_2(s)\}$ since the return-ratio matrix is of order two representing the d-q frame. The characteristic gains of $L_{dq}(s)$ may be readily found by solving the eigenvalue problem of equation (14) shown at 127 of FIG. 1B, where $\Delta(l, s)$, also known as the characteristic equation of $L_{dq}(s)$, is a polynomial on l and s. Expanding equation (14) and replacing equation (13) in it yields equations (15) and (16) as shown at 129 of FIG. 1B so that $\Delta(l, s)$ may be written as equation (17) as shown at 13129 of FIG. 1B. Expanding equation (17) as shown at 131 of FIG. 1B yields the second order polynomial of equation (18) shown at 133 of FIG. 1B with roots that are determined by equation (19) shown at 135 of FIG. 1B.

Figures 7A, 7B:
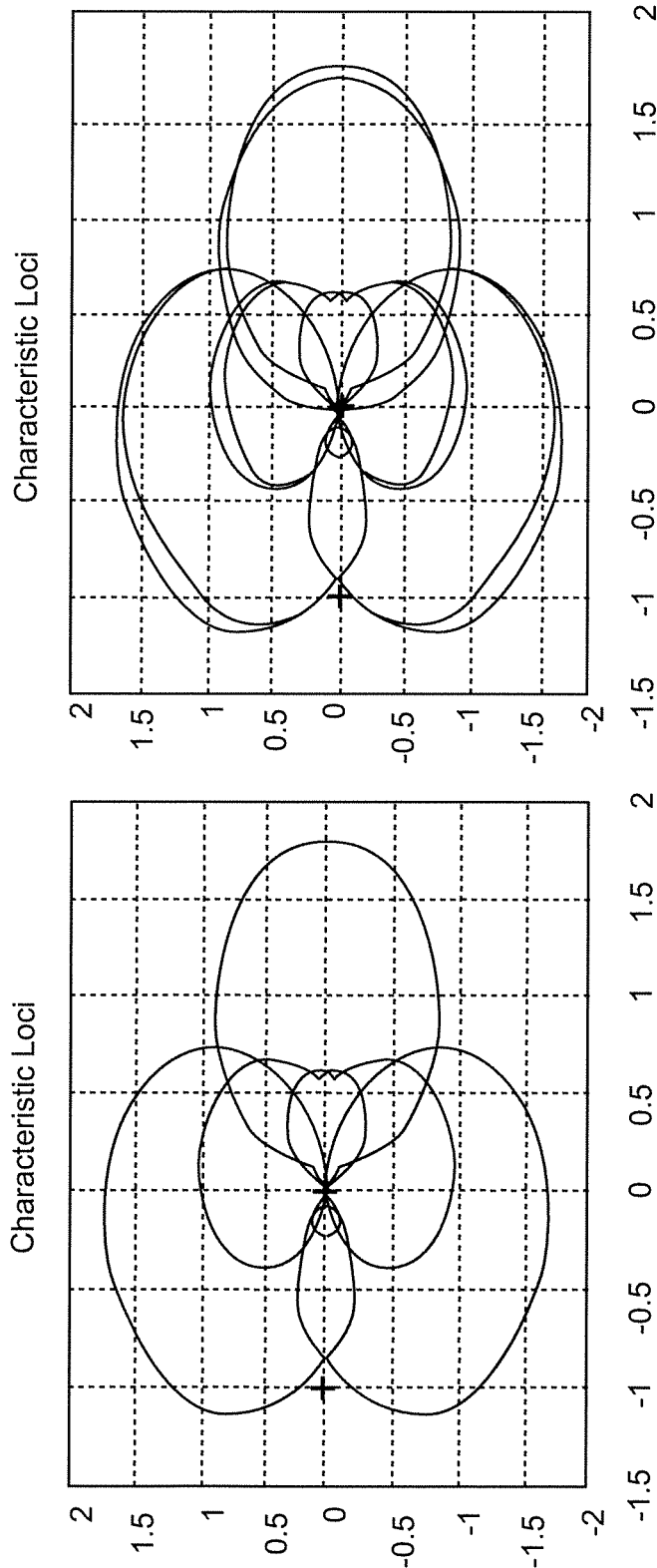
FIG. 7A is a plot of the characteristic loci of the return-ratio matrix.
FIG. 7B is a superposition of FIGS. 6 and 7A for purposes of comparison.

FIG. 7A shows the characteristic loci of the return-ratio matrix $L_{dq}(s)$ obtained for the case under consideration in which the frequency dependent eigenvalues $\{l_1(s), l_2(s)\}$ determined with equation (19) are drawn. These loci are strikingly similar to the Nyquist diagram of the return ratio matrix, $L_{dq}(s)$, depicted in FIG. 6 in that they have approximately the same shape and are very close in magnitudes. To examine the similarity more closely, FIG. 7B shows the characteristic loci of $L_{dq}(s)$ with the d-d and q-q elements $L_{dd}(s)$ and $L_{qq}(s)$ superimposed thereon. The close match of the eigenvalue trajectories and the Nyquist diagrams of these impedance elements is clearly evident.

This similarity can be explained by analysis of equation (19) from which it can be seen that, if the condition shown in inequality (20), illustrated at 141 of FIG. 1C, is met, where $\zeta$ is an adequately large constant, the root term in equation (19) may be approximated by equation (21) shown at 143 of FIG. 1C. The eigenvalues of $L_{dq}(s)$ are then approximated by equation (22) as shown at 145 of FIG. 1C. Therefore, $$l_1(s) = L_{dd}(s) \text{ and}$$

$$l_2(s) = L_{qq}(s) \quad (23)$$

as shown at 146 of FIG. 1C.

This shows that if the condition of inequality (20) is met, the eigenvalues or characteristic gains of the return-ratio matrix $L_{dq}(s)$ correspond to its d-d and q-q impedance elements. These eigenvalues or characteristic gains, in turn, are defined by equations (12) and (13) so that equation (23) may be rewritten in terms of the d-q frame channel impedances as shown in equations (24) illustrated at 147 of FIG. 1C.

Equations (24) are relevant for the study of stability at AC interfaces feeding AFE converters as they show that the eigenvalues required to apply the generalized Nyquist criterion are given by the single-input single-output return ratios of the d-d and q-q channels. That is, the multi-variable stability problem reduces to two equivalent independent DC-like channels. Furthermore, this implies that the multi-variable stability assessment may be conducted by applying the standard Nyquist stability criterion on both d-q frame channels of interest. The stability at the AC interface may then be enforced by providing suitable forbidden regions for the source and load scalar impedances $Z_{sdd}(s)$, $Z_{sqq}(s)$, $Z_{Ldd}(s)$ and $Z_{Lqq}(s)$.

Figure 8:
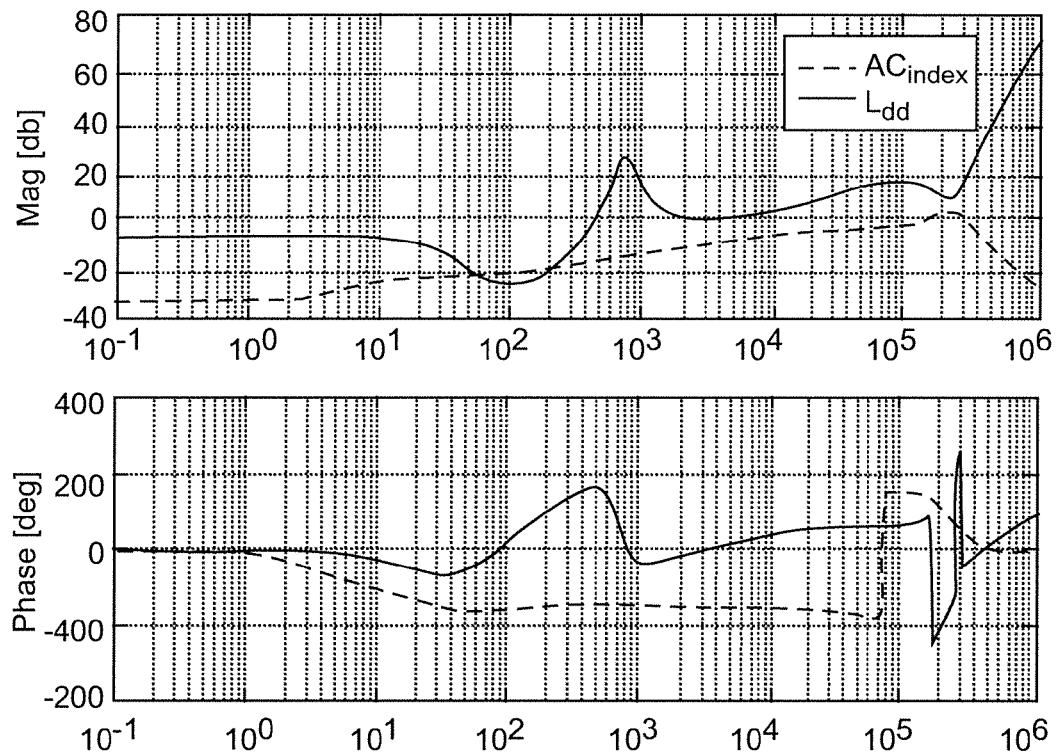
FIG. 8 illustrates graphs of the magnitude and phase of a figure of merit, $AC_{index}$, and the $L_{dd}(s)$ element of the return-ratio matrix of an AFE converter.

In order to evaluate condition (20), which determines if the eigenvalues of $L_{dq}(s)$ are given or not by equations (24), a figure of merit, $AC_{index}(s)$ is defined by equation (25), as shown at 149 of FIG. 1C. FIG. 8 shows $AC_{index}(s)$ plotted together with the d-d element of the return-ratio matrix of $L_{dq}(s)$. Since the latter return-ratio matrix is known to have negative phase and reflect the constant power load dynamics of the AFE converter on the AC bus, its Bode plot (equivalent to the Nyquist diagram) is of principal interest for studying the AC stability problem. FIG. 8 shows how, for frequencies higher than 400 Hz, the voltage loop bandwidth, the magnitude of $AC_{index}(s)$ is always higher than 0 dB and, in consequence, condition (20) is met although with varying amplitudes of constant z. More importantly, FIG. 8 shows that $AC_{index}(s)$ is positive for $L_{dd}(s)$ magnitudes higher than −20 dB, that is, $L_{dd}(s)$ is positive when the magnitude of $L_{dd}(s)$ approaches 0 dB, which, depending on its actual phase, could translate into encirclements of the critical point (−1, j0). Thus, FIG. 8 has shown that for AC interfaces feeding AFE converters, the condition required to simplify the multi-variable stability problem into two DC-like stability problems is easily met and equation (24) may be used to determine a close approximation of the eigenvalues of the return-ratio matrix $L_{dq}(s)$.

If condition (20) is not met, then the stability analysis at given AC interface would regress to the standard multi-variable case using the GNC for its assessment. This could be caused, for example, by a source with poor dynamic characteristics, or by other constant power loads with input characteristics different of those of an AFE converter.

The above analysis in accordance with the invention can be further simplified if the return ratios of the single-input single-output (SISO) d-d and q-q channels are examined more closely. As already discussed, the Nyquist diagram of the q-q element or channel of both the AFE converter input admittance $Y_{Ldq}(s)$ and of the return-ratio matrices lie primarily on the right-half of the complex plane. This is due to the 0° phase observed on their respective Bode plots as a consequence of the current vector control as discussed above with reference to FIG. 4. On the other hand, the Nyquist diagram of the d-d elements of these two matrices present a negative phase of 180°, indicating that this channel is the only one that could cause the AC voltage at the interface to become unstable. To verify that this reasoning is correct and that the d-d channel is indeed the one causing the instability of the system, Gershgorin's theorem delimiting the location of the eigenvalues in the complex plane may be applied as follows:

Theorem: The eigenvalues of an m×m complex matrix A of elements $[a_{ij}]$ lie in the union of discs (for i=1, 2, ..., m) defined by expressions (31) illustrated at 151 of FIG. 1C.

The Gershgorin Disks of a given matrix function of the complex variable s, namely Q(s), of order m×m will sweep out bands of overlapping discs across the complex plane as its diagonal elements $[q_{ii}(s)]$ draw out magnitude-phase polar plots $N_1, N_2, \ldots N_m$ in the complex plane as s traverses the standard Nyquist contour in a clockwise direction. These bands are known as Gershgorin's Bands and delimit the feasible location of the eigenvalues of Q(s) in the complex plane.

Figure 9:
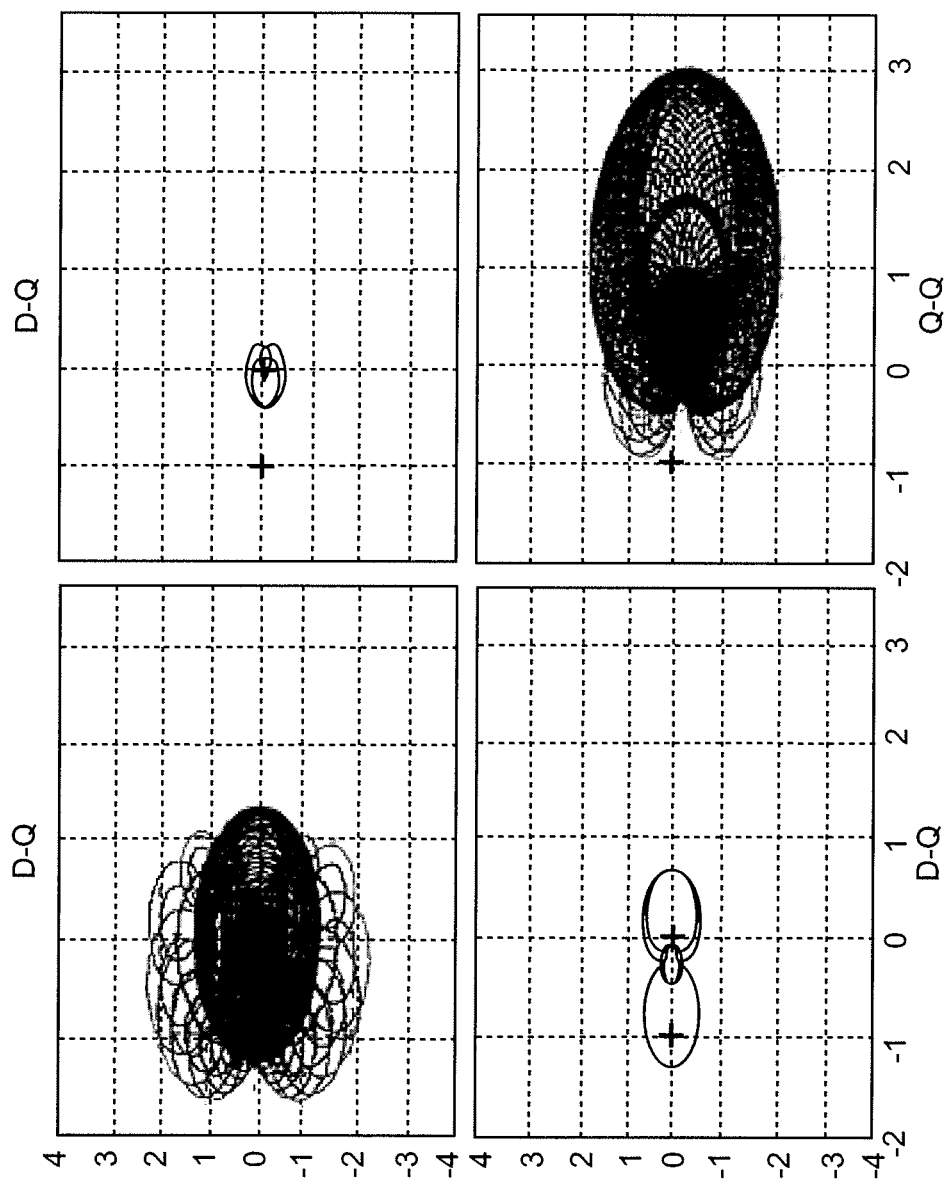
FIG. 9 illustrates Gershgorin bands superimposed on FIG. 5.

The Gershgorin bands depend on the d-q frame alignment used to calculate the source and load impedances $Z_{sdq}(s)$ and $Z_{Ldq}(s)$, respectively. It can be shown accordingly that the best alignment in terms of information conveyed from the bands is to be fully aligned with the active power channel, since the constant power load dynamics of the load will be reflected on this channel. The Gershgorin bands for the sample system under consideration, with Nyquist array as depicted in FIG. 6, is shown in FIG. 9. This Nyquist array with superimposed bands shows how the feasible region for the eigenvalues of $L_{dq}(s)$ includes the critical point (−1, +j0) only for the eigenvalue associated to the d-d channel. The band around the q-q channel is clearly out of range for encircling this point. This graphical tool thus shows that the multi-variable stability problem is further reduced in accordance with the invention to the study of a single DC-like case, i.e., the single-input single-output stability of the d-d channel return ratio defined by equation (27), illustrated at 153 of FIG. 1C.

Figure 10:
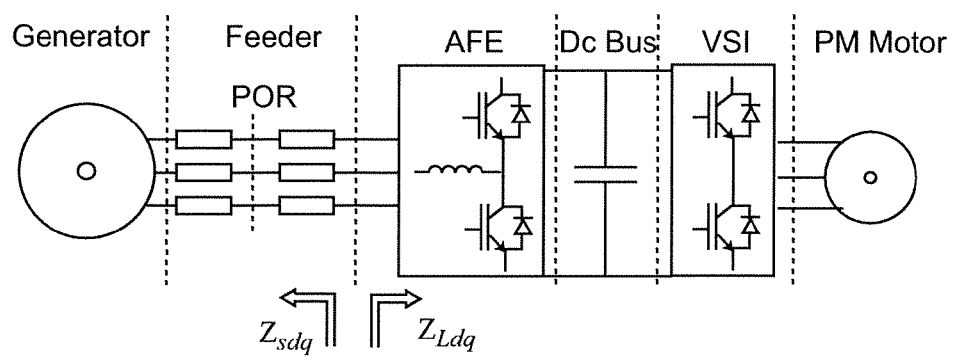
FIG. 10 is a schematic diagram of an exemplary generalized power system illustrating the interface of the source and load d-q frame impedances.

FIG. 10 shows a generic AC interface of a three-phase power system feeding a three-phase high power factor rectifier. The generator is assumed to have an rms voltage loop to regulate the AC bus voltages at the point of regulation (POR). A three-phase feeder connects the rectifier to the bus. The rectifier in turn is vector controlled in the d-q frame using cascaded current-voltage loops, where the output DC voltage is regulated using the d-axis current loop, and the q-axis current reference is set to zero to ensure unity power factor. The rectifier, in turn, feeds a voltage source inverter (VSI) driving a vector controlled motor.

In accordance with the stability criterion of the invention, the small-signal stability at the input terminals of the rectifier is determined by the characteristic loci described by the eigenvalues of the corresponding return-ratio matrix $L_{dq}(s)$. Given the input dynamics of the high power factor rectifier. The condition of inequality (20) is, in effect, met in the frequency band where the negative input admittance of the rectifier could cause unstable operation, so that the eigenvalues of L(s) at the AC interface are, in turn, given by equations (24). Further, it can be shown by use of the Gershgorin bands, which delimit the region for the possible location of the eigenvalues of the return ratio matrix L(s) in the complex plane, that only the eigenvalue associated to the d-d channel, i.e., $l_1(s)=L_{dd}(s)=Z_{sdd}(s)\cdot Y_{Ldd}(s)$, can actually encircle the critical point (−1+j0), and thus be the cause of instability. Furthermore, the characteristic locus of this eigenvalue corresponds to the Nyquist diagram of the scalar return-ratio $L_{dd}(s)=Z_{sdd}(s)\cdot Y_{Ldd}(s)$, i.e., the polar plot of $L_{dd}(s)$ as s traverses the standard Nyquist contour in a clockwise direction.

The stability problem at the input terminals of a three-phase high power factor rectifier is thus reduced to the single-input single-output (SISO) case, where the standard Nyquist stability criterion may be employed to assess the stability of the AC system, and a forbidden region for the locus of $L_{dd}(s)$ may be established to ensure the AC stability, similarly to the forbidden region criteria developed for DC distributed power systems.

Figure 11:
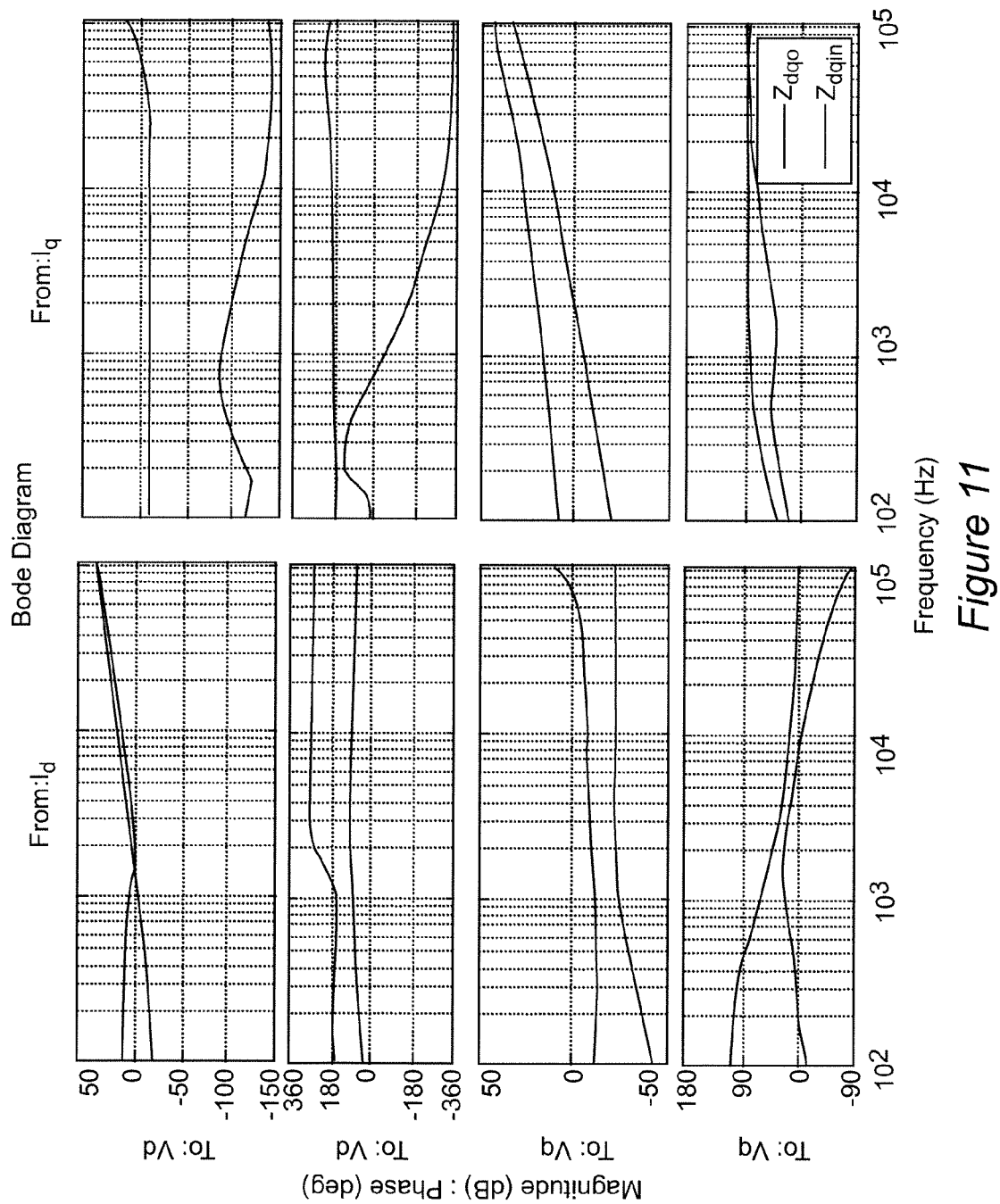
FIG. 11 is a Bode diagram of source and load impedances at input terminals of an AFE converter.
Figure 12:
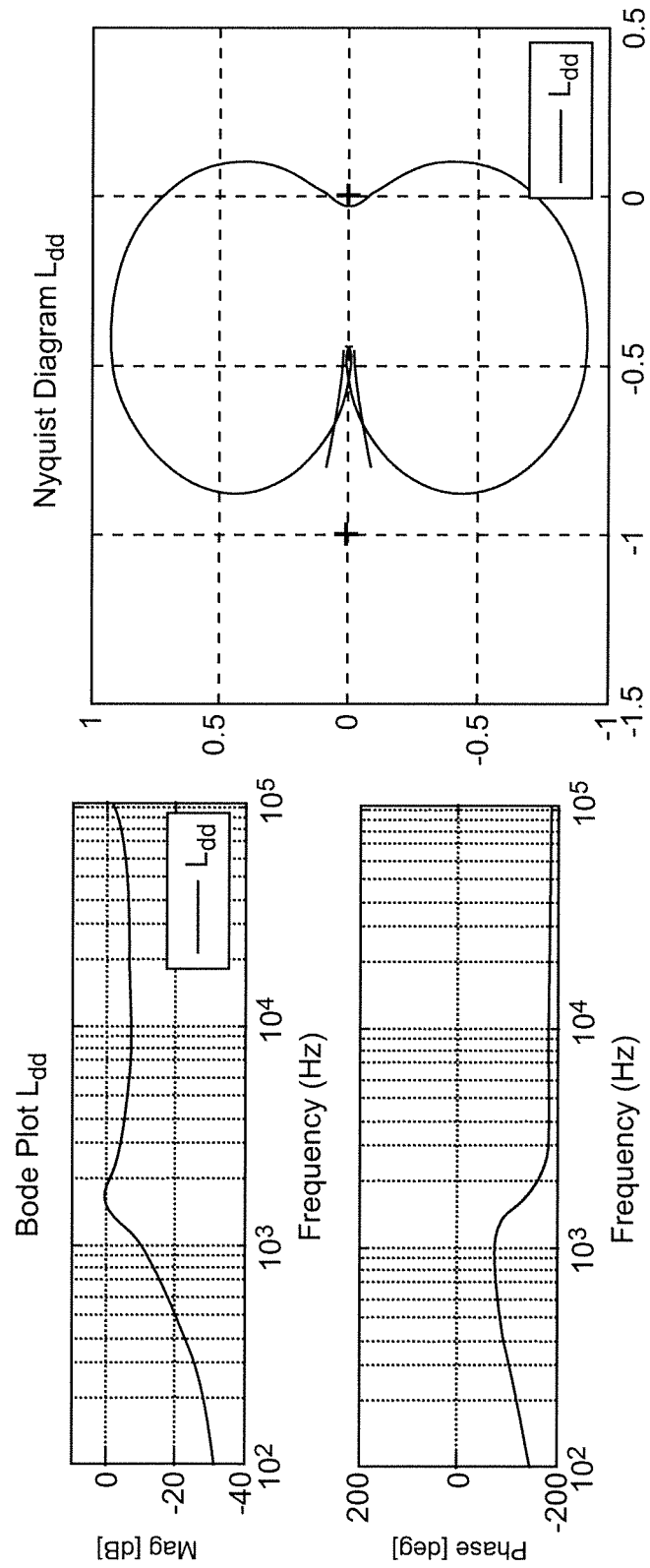
FIG. 12 illustrates Bode and Nyquist diagrams depicting the d-d channel SISO return-ratio in accordance with the stability criterion of the invention.

For verification purposes the reduced power system shown in FIG. 10 has been simulated and used to verify the stability at the AC terminals. The input and output impedances at the interface are calculated and shown in FIGS. 11 and 12, which shows both $Z_{sdq}(s)$ and $Z_{Ldq}(s)$. FIGS. 11 and 12 show the Bode plot and Nyquist diagram of the d-d channel return ratio per the proposed stability criterion, clearly showing that the system is stable.

Figure 13:
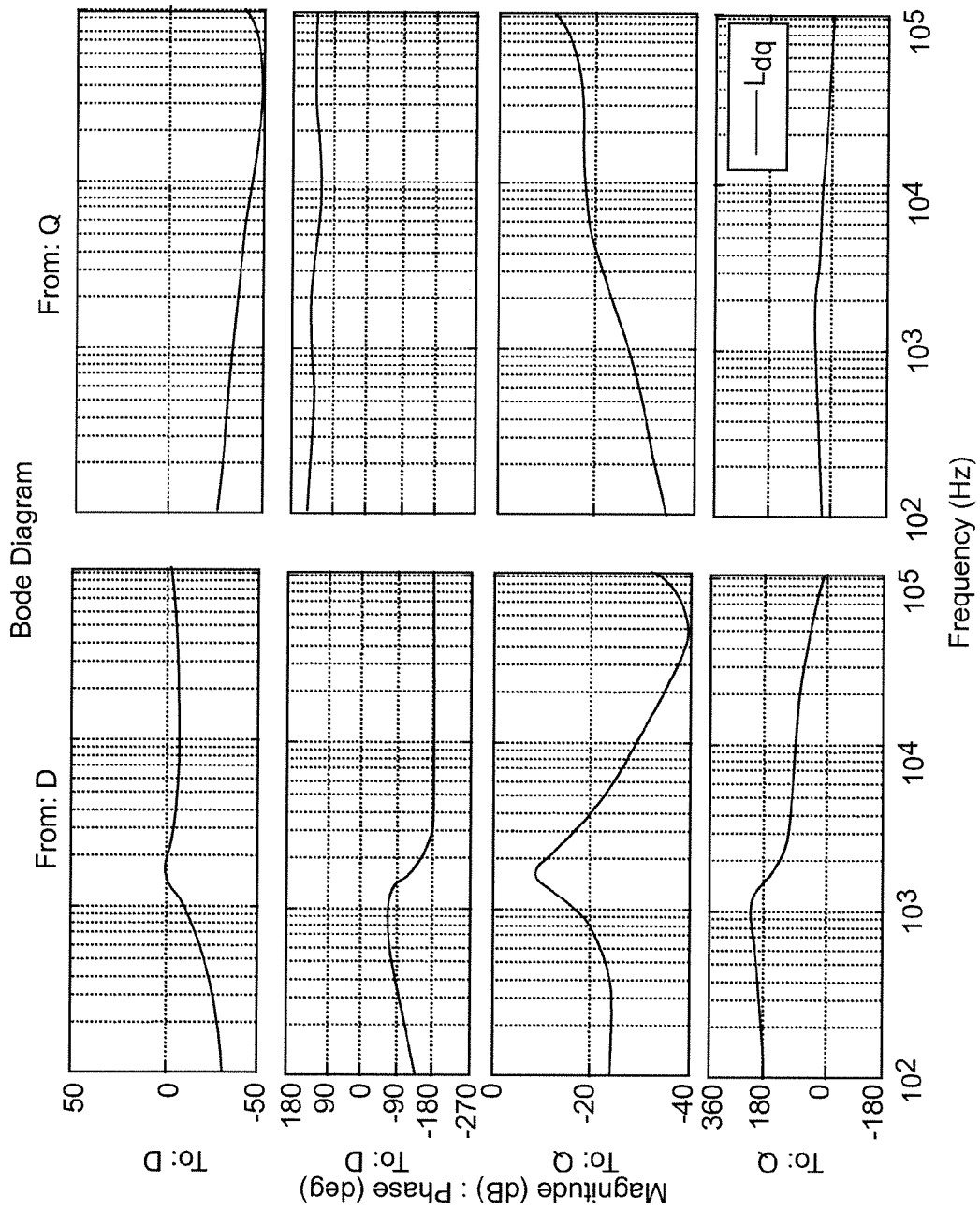
FIG. 13 illustrates a Bode diagram depicting the d-q frame return ratio.
Figure 14A:
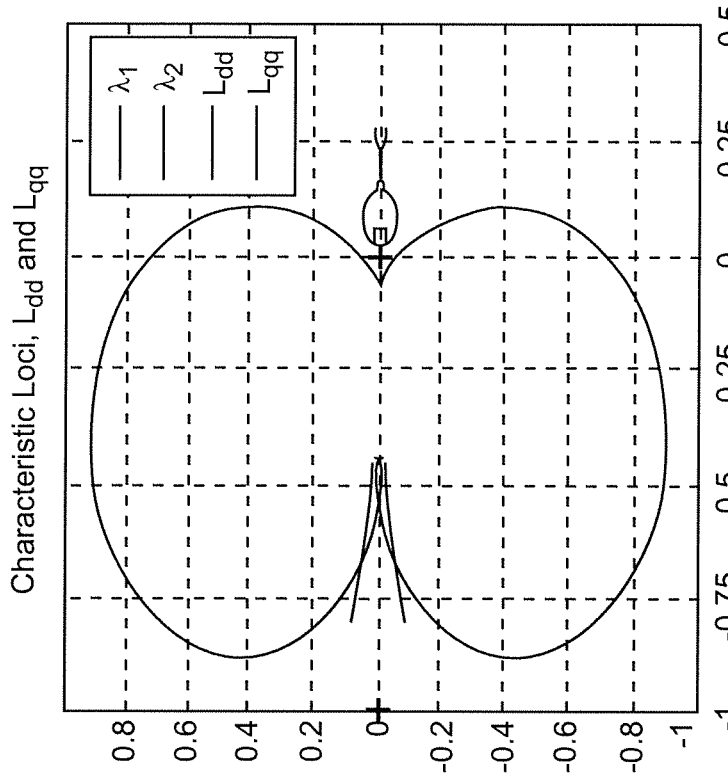
FIGS. 14A and 14B illustrate the characteristic loci of the return-ratio matrix, $L_{dq}(s)$, the characteristic loci with superimposed SISO Nyquist diagrams of the d-d and q-q channel return-ratios.
Figure 14B:
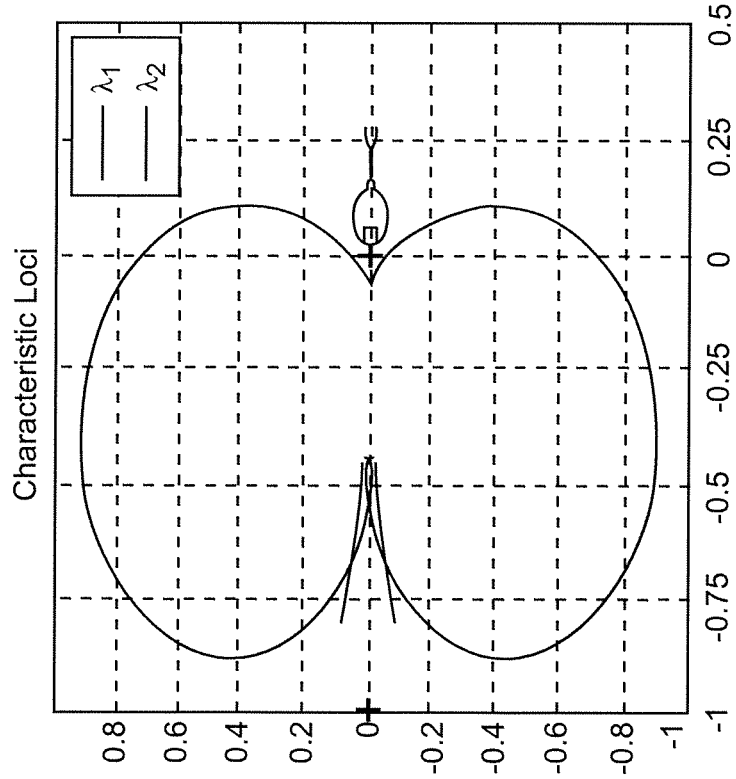
Figures 14C, 14D:
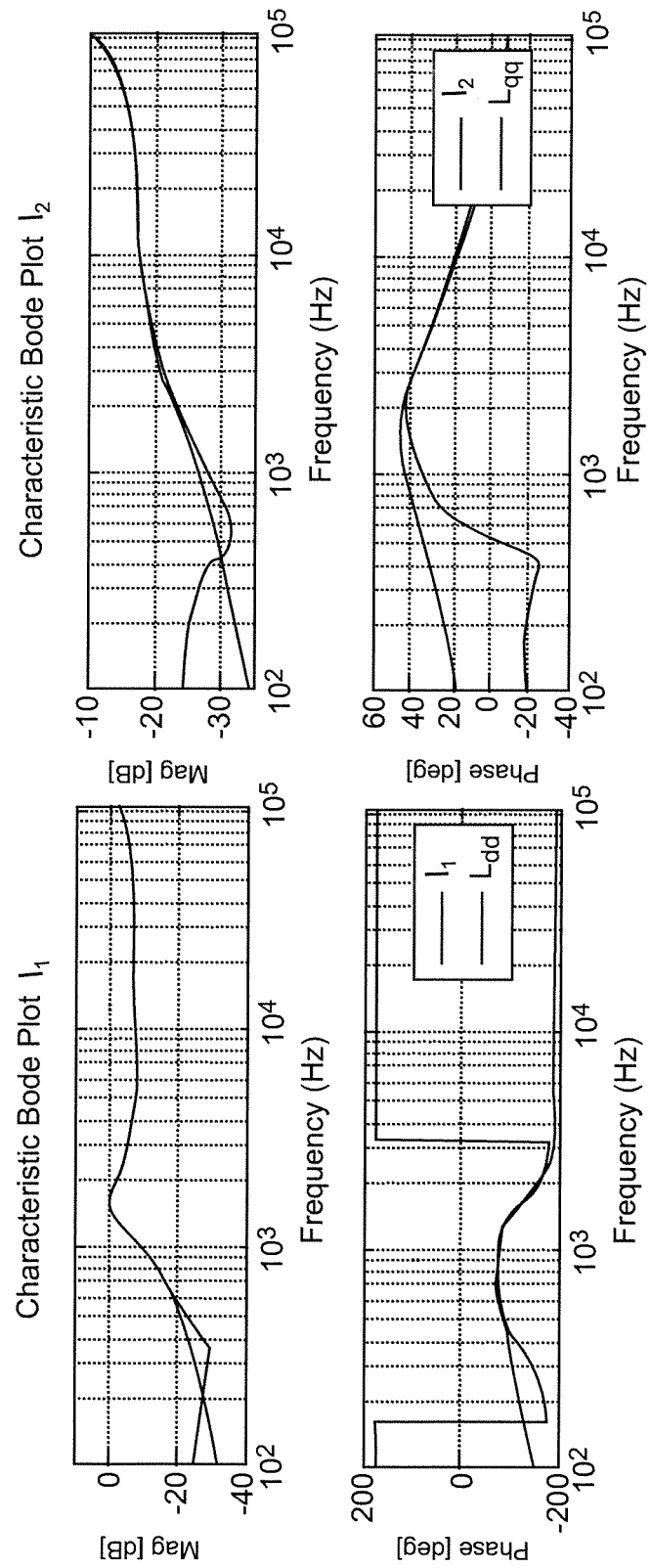
FIGS. 14C and 14D are Bode plots of eigenvalues $l_1(s)$ and $l_2(s)$ superimposed with SISO d-d and q-q return-ratios $L_{dd}(s)$ and $L_{qq}(s)$.

To verify the above, FIG. 13 shows the resultant return-ratio matrix $L_{dq}(s)$, that is the matrix quotient of the input and output d-q frame impedances, and FIG. 14A shows the corresponding characteristic loci showing how neither eigenvalue encircles the critical point (−1, +j0), in agreement with the stability criterion in accordance with the invention. Further, FIG. 14B shows the concurrent polar or Nyquist diagram plots of the return-ratio $L_{dq}(s)$ eigenvalues $l_1(s)$ and $l_2(s)$ and the single-input single-output d-d and q-q channel return ratios $L_{dd}(s)$ and $L_{qq}(s)$, clearly showing how they lie on top of each other as predicted. This is better seen in FIGS. 14C and 14D, which show the corresponding Bode plots of FIG. 13. As observed, the overlapping in the latter is one-to-one for magnitudes higher than −20 dB in both cases, showing that for return ratios of higher magnitudes, i.e., when encirclements could occur as they approach 0 dB or unity magnitude in the Nyquist diagram, the d-d and q-q channel return ratios effectively determine the stability of the three-phase AC system per the generalized Nyquist stability criterion.

Figure 15:
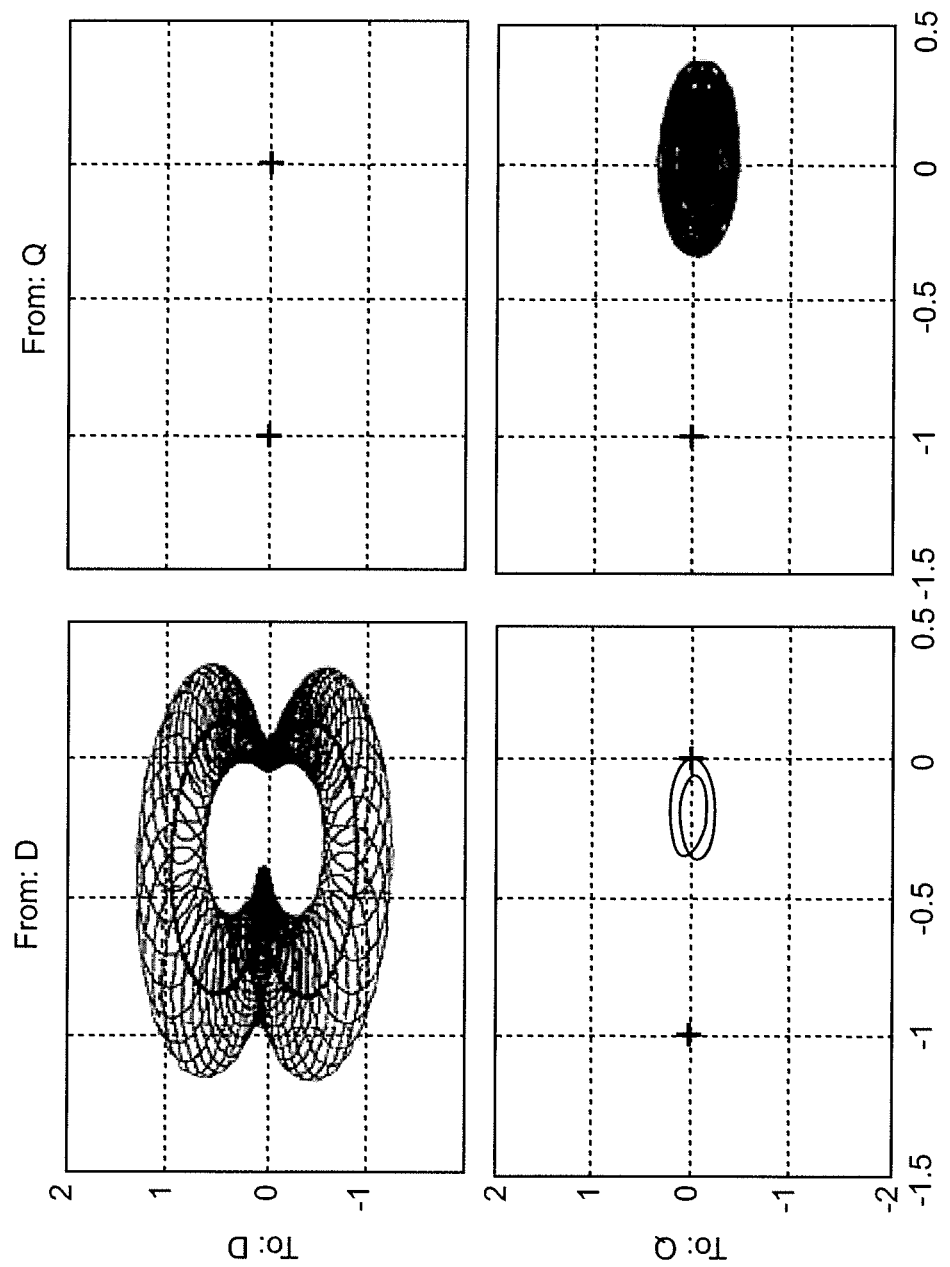
FIG. 15 illustrates Nyquist diagrams of the return-ratio matrix with superimposed Gershgorin bands depicting the possible locations of the return-ratio eigenvalues $l_1(s)$ and $l_2(s)$ in the complex plane.

Finally, the use of Gershgorin bands can be used to show that only the d-d channel dynamic can cause instability. This is shown in FIG. 15, which indicates that the eigenvalue associated to the q-q channel single-input single-output return ratio cannot encircle the critical point (−1+j0). The stability of three-phase AC interfaces at the input terminals of high power factor rectifiers is then solely determined by the d-d channel SISO return ratio $L_{dd}(s)$. The standard Nyquist stability theorem may then be employed to assess the stability at AC interfaces instead of the multi-variable Generalized Nyquist Stability Criterion.

In view of the foregoing, it is clearly seen that the invention provides a much simplified method of determining the stability of three-phase AC interfaces to active front end (AFE) rectifiers in power circuits. Specifically, as the inventors have discovered and demonstrated as discussed above, by substituting the loci of the readily available or determinable (e.g. by measurement or through circuit design or analysis) the d-d and q-q impedance elements of the d-q frame for loci of the eigenvalues or characteristic gains of the return-ratio matrix as close approximations thereof, when the condition of inequality (20) is met (as can usually be easily achieved), the multi-variable stability assessment that has required application of the generalized Nyquist stability criterion (GNC) in regard to AC power circuits can be reduced to an assessment similar to a pair of DC-like channels. The problem can be further simplified by recognition, as the inventors have also discovered, that only the d-d power transfer channel can be the source of instability in an AC power circuit; reducing the assessment to the evaluation of applying the standard Nyquist stability criterion to a single SISO circuit model configuration.

To determine the impact of EMI filters at the input of rectifiers several case studies were run. In all of them, it was consistently observed that the condition to apply the proposed stability criterion $AC_{index}(s)>0$ dB was found to be applicable across the frequency range of interest, that is, when the magnitude of $L_{dd}(s)>0$ dB. This condition was verified and deemed sufficient to determine the stability at the given AC interface by means of the stability criterion in acco45rdance with the invention. Nonetheless, the use of Gershgorin bands was not possible in the presence of EMI filters.

Regarding the injection of reactive power by the active front-end converter, or the operation of the converter in parallel with inductive loads, it was also possible to verify the applicability of the stability criterion in accordance with the invention. In effect, the $AC_{index}(s)>0$ dB condition was verified, and consequently the d-d channel return ratio perfectly matched the trajectory of the corresponding eigenvalue of the return ratio $L_{dq}(s)$. In this case the Gershgorin bands could be used and showed that only the eigenvalue associated with the active power transfer could be the source of instabilities.

Regarding the alignment with the d-q frame for the impedance calculation or measurement, it was shown using Gershgorin's theorem that the most suitable alignment to calculate these impedances is to be fully aligned with the power transfer channel, that is, the d-axis or q-axis where active power is transferred to the loads. Solely under this condition will the d-d and q-q channel impedances match the characteristic loci of the return ratio matrix $L_{dq}(s)$, and the stability criterion in accordance with the invention be valid.

In summary, based on the Generalized Nyquist stability Criterion (GNC), it has been shown that the AC stability at the input terminals of a high power factor rectifier is determined by the single-input single-output return-ratio of the d-d channel or the power transfer channel of the desired d-q frame alignment, since the conventional Nyquist diagram of this return ratio $L_{dd}(s)$ matches the corresponding eigenvalue of the return ratio matrix $L_{dq}(s)$. Further, it was shown that the return ratio of the q-q channel or reactive power transfer channel-matches the second eigenvalue of the return ratio matrix $L_{dq}(s)$, and that its trajectory on the complex plane is such that it cannot encircle the critical point (−1, +j0) and be the cause of instability. The AC stability at the input terminals of the rectifier can then be evaluated by using the standard Nyquist stability theorem for single-input single-output (SISO) systems, and applying it to the return ratio $L_{dd}(s)$ corresponding to the ratio between the d-d channel source and load impedances.

While the invention has been described in terms of a single preferred embodiment, those skilled in the art will recognize that the invention can be practiced with modification within the spirit and scope of the appended claims.

The invention claimed is:

1. A method of assessing stability of a combination of an AC power source and an active front end (AFE) power converter, said method comprising steps of
    applying a synchronized frame of reference to a model of the AC source and power converter,
    approximating loci of eigenvalues or characteristic gains of a return ratio matrix of said model by the loci of the d-d and q-q impedance elements of said synchronous frame of reference applied to said model, and
    determining stability of said combination of said AC power source and said power converter at an interface thereof by application of a standard Nyquist stability criterion.

2. The method as recited in claim 1, including a further step of
    determining forbidden conditions of operation where instability of said combination of AC power source and power converter could occur.

3. The method as recited in claim 1, wherein said power converter is a DC power converter.

4. The method as recited in claim 1, wherein said power converter is an AC power converter.

5. The method as recited in claim 4, wherein said AC power converter is a frequency changer.

6. The method as recited in claim 1 including a further step of aligning a d-axis of said d-q frame such that the q-axis voltage equals zero.

7. The method as recited in claim 1 wherein said assessment is conducted based solely on the source and load impedances measured on the d-q frame.

8. The method as recited in claim 1, wherein the standard Nyquist stability criterion is a single input, single output Nyquist stability criterion.

9. The method as recited in claim 1, wherein said assessment is based solely on the d-d power transfer channel of the d-q frame.

10. The method as recited in claim 1, wherein said method is based solely on source and load impedances relative to an interface between stages of a high power factor power conversion circuit.

11. A method of designing a power circuit comprising a combination of an AC power source and an active front end (AFE) power converter, said method comprising steps of
    applying a synchronized frame of reference to a model of the AC source and power converter,
    approximating loci of eigenvalues or characteristic gains of a return ratio matrix of said model by the loci of the d-d and q-q impedance elements of said synchronous frame of reference applied to said model, and
    determining stability of said combination of said AC power source and said power converter at an interface thereof by application of a standard Nyquist stability criterion.

12. The method as recited in claim 11, including a further step of
    determining forbidden conditions of operation where instability of said combination of AC power source and power converter could occur.

13. The method as recited in claim 11, wherein said power converter is a DC power converter.

14. The method as recited in claim 11, wherein said power converter is an AC power converter.

15. The method as recited in claim 14, wherein said AC power converter is a frequency changer.

16. The method as recited in claim 11 including a further step of aligning a d-axis of said d-q frame such that the q-axis voltage equals zero.

17. The method as recited in claim 11 wherein said assessment is conducted based solely on the source and load impedances measured on the d-q frame.

18. The method as recited in claim 11, wherein the standard Nyquist stability criterion is a single input, single output Nyquist stability criterion.

19. The method as recited in claim 11, wherein said assessment is based solely on the d-d power transfer channel of the d-q frame.

20. The method as recited in claim 11, wherein said method is based solely on source and load impedances relative to an interface between stages of a high power factor power conversion circuit.

\* \* \* \* \*